W. H. SHEPPARD.
MACHINE FOR MAKING PAPER DRINKING CUPS.
APPLICATION FILED NOV. 13, 1916.

1,308,767.

Patented July 8, 1919.
8 SHEETS—SHEET 1.

INVENTOR=
William H. Sheppard
By his attorneys

W. H. SHEPPARD.
MACHINE FOR MAKING PAPER DRINKING CUPS.
APPLICATION FILED NOV. 13, 1916.

1,308,767.

Patented July 8, 1919.
8 SHEETS—SHEET 3.

INVENTOR=
William H. Sheppard
By his attorneys

W. H. SHEPPARD.
MACHINE FOR MAKING PAPER DRINKING CUPS.
APPLICATION FILED NOV. 13, 1916.

1,308,767.

Patented July 8, 1919.
8 SHEETS—SHEET 4.

INVENTOR=
William H. Sheppard
By his attorneys

W. H. SHEPPARD.
MACHINE FOR MAKING PAPER DRINKING CUPS.
APPLICATION FILED NOV. 13, 1916.

1,308,767.

Patented July 8, 1919.
8 SHEETS—SHEET 6.

INVENTOR=
William H. Sheppard
By his attorneys.

W. H. SHEPPARD.
MACHINE FOR MAKING PAPER DRINKING CUPS.
APPLICATION FILED NOV. 13, 1916.

1,308,767.

Patented July 8, 1919.
8 SHEETS—SHEET 7.

UNITED STATES PATENT OFFICE.

WILLIAM H. SHEPPARD, OF WORCESTER, MASSACHUSETTS, ASSIGNOR TO JOHN A. SHERMAN, OF WORCESTER, MASSACHUSETTS.

MACHINE FOR MAKING PAPER DRINKING-CUPS.

1,308,767.     Specification of Letters Patent.     Patented July 8, 1919.

Application filed November 13, 1916. Serial No. 130,994.

*To all whom it may concern:*

Be it known that I, WILLIAM H. SHEPPARD, of Worcester, in the county of Worcester and State of Massachusetts, a citizen of the United States, have invented a new and useful Improvement in Machines for Making Paper Drinking-Cups, of which the following is a specification.

In application for United States patent Serial No. 834,578, filed April 27, 1914 by J. E. Sherman, there is described a drinking cup preferably made of paper, gummed and folded and having some of the characteristics of what is known as an open-end envelop. As now made, it differs from an open-end envelop of ordinary construction, however, in that the closed end has a double fold so that there is no possibility that water can leak out from it, while the open end has a double thickness of paper so as to prevent the lip of the user being cut as it might be by the edge of a single thickness of paper.

The present invention relates to a machine for making a cup of this character, and it will be understood by reference to the drawings in which it is shown in its preferred form. It will be understood, however, that as the drinking cup itself resembles an open-end envelop, as above stated, so the machine on which it is constructed resembles in many respects a machine of ordinary construction for making such open-end envelops, and only so much of the mechanism is shown in the drawings as differs from such machine, these differences relating mainly to the folding mechanism.

In the drawings, therefore:—

It will be understood that, just as in the ordinary envelop machine well known in the art, gummers of proper character and shape are mounted and operated in the usual way to supply gum to the blank, the blank is lifted and carried from the gumming mechanism to the creasing frame in the ordinary way, the creasing frame is located with relation to the folding box as usual, and the blank is driven in the usual manner through the creasing frame into the folding box by a plunger.

A is the bed plate supporting the folding box, the bottom of the folding box being marked B. C is the plunger and D is the creasing frame which is supported on posts $d$ in the usual manner and is like the ordinary creasing frame except that it is three-sided, one end only being closed. The plunger is generally speaking, rectangular, but is recessed at one end as at $c$, leaving two horns or projections $c^1$ one on each side thereof. The main portion of the bottom or bed of the folding box is preferably integral with the bed plate A, and it has the usual ring $b$ or rectangular frame mounted on adjustable springs $b^1$. The springs tend to depress it against adjustable stop pins $b^2$.

Figures 3, 9:
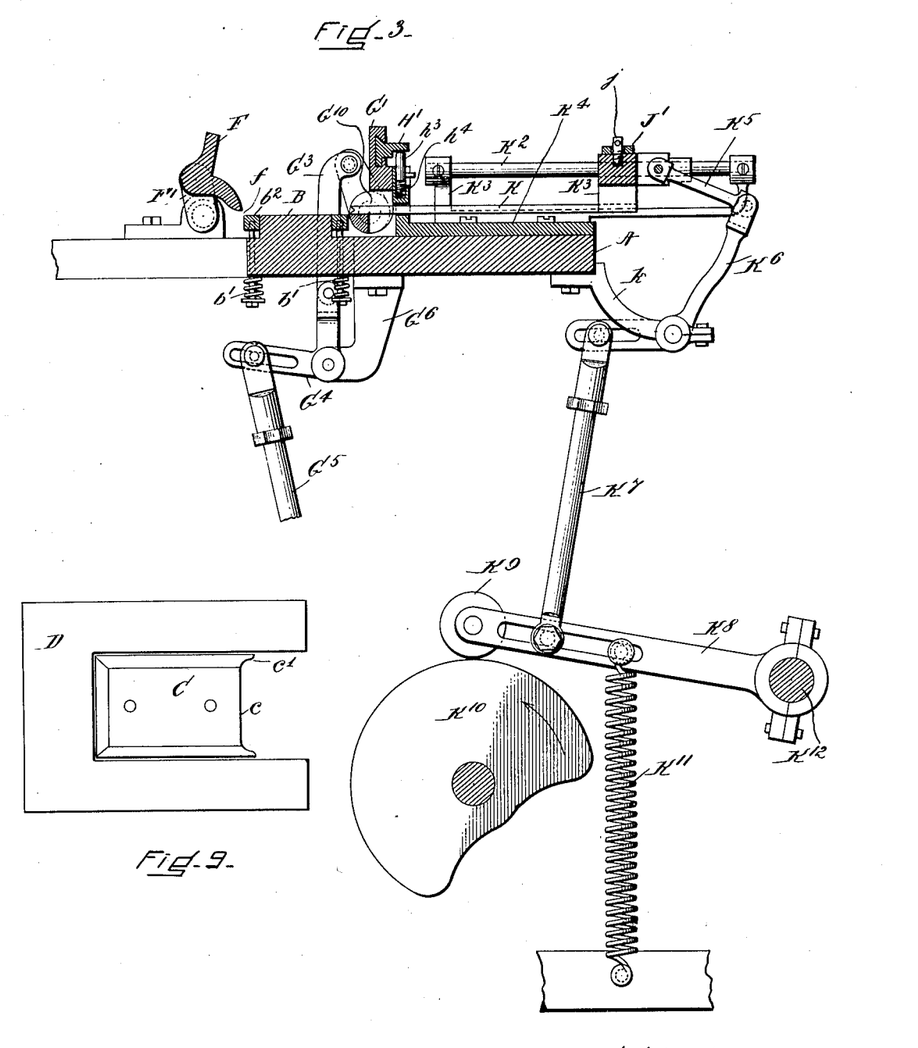
Fig. 9 is a plan view of the creasing frame and plunger.

The folders are lettered E, F and G. The folder E is mounted in bearings $e$ carried on the end of a yoke piece $E^1$ which is bolted to the bed plate A. The folder E has ears $E^2$ to which is connected a connecting rod $E^3$ leading to a bell crank $E^4$ which passes down through the bed plate A, being supported upon hangers $E^5$ below the bed plate A. It is rocked by the usual cam (not shown) to which it is connected by a cam rod $E^6$. The operation of this folder differs in no respect from the corresponding folder in any envelop machine. The folder F is the folder under which the envelop is ejected in a certain class of machine. For this latter purpose it is mounted on a shaft $F^1$ which is bent to form an opening as at $f$ (see Fig. 3) available when the folder is lifted through which to eject the completed envelop. The shaft $F^1$ is supported in bearings $F^2$ on the bed plate and is connected by an arm $F^3$ with a connecting rod $F^4$ which passes over the bed plate and is connected at its farther end with a bell crank lever $F^5$ connected at its outer end with a cam rod $F^6$. A shaft $G^{10}$ carries the opposite folder G and is mounted in bearings $G^1$ on the bed plate A and carries at one end an arm $G^2$ connected by a connecting rod $G^3$ with the lever $G^4$ mounted on hangers $G^6$ and connected by a cam rod $G^5$ with a suitable cam to give it the usual rocking motion. The cams operating these folders are not shown, being of ordinary construction.

The folder G differs in its construction from the other folders in that it has a slide piece H constructed to run in a dove-tailed groove on what is the top side of the folder when in its folding position. This slide piece has attached to it a bar $H^1$ which projects some distance to the right (see Figs. 1 and 5) beyond the folder G, and said slide piece H also carries near its outer end a beveled crossbar $H^2$ of the width of the folding box at its front end and serving to insure the proper creasing of the bottom of the blank which is to form the drinking cup. To insure the proper positioning of the crossbar $H^2$ the bar $H^1$ has a shoulder $h$ adapted to engage with a spring stop $h^1$ mounted in a housing $h^2$ on the folder G. The end of this stop as shown is enlarged to form a head $h^3$ and a spring $h^4$ surrounds the stop rod so as to hold the stop normally in forward position (see Fig. 5). Opposite the shoulder $h$ is a beveled portion $h^5$, this construction being such that while the bar $H^1$ may be pushed to the left in Fig. 5 indefinitely, when pushed to the right the head $h^3$ will engage the shoulder $h$ and act therewith to limit the movement of the bar $H^1$ and crossbar $H^2$.

The mechanism for throwing this bar to the right comprises a rod J mounted in line therewith in suitable bearings on the bed plate A and located to engage the slide piece H when the folder G is in open position. It is operated from the mechanism and by the cam which ejects the finished drinking cup, the ejectors being marked K and being attached to a slide piece $K^1$ running on rods $K^2$ mounted in suitable supports $K^3$ on a plate $K^4$ attached to the bed plate A. The slide piece $K^1$ is operated by means of a connecting rod $K^5$ connecting it with a bell crank lever $K^6$ mounted on a bracket $k$ and operated by a connecting rod $K^7$ and cam lever $K^8$ carrying a cam roll $K^9$ running on the cam $K^{10}$ and held against it by a spring $K^{11}$, the other end of the cam rod $K^8$ being mounted to rock on a stud $K^{12}$.

Figure 1:
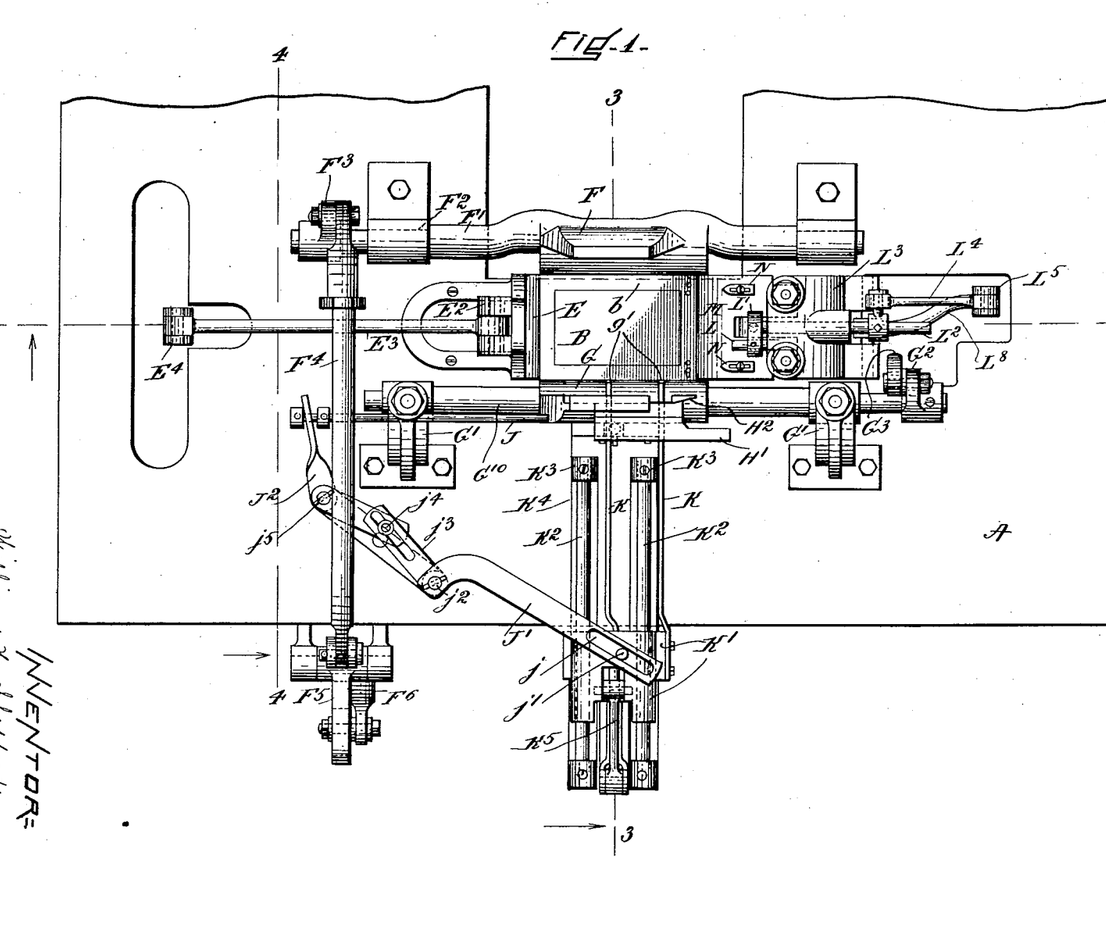
Figure 1 shows a plan of the folding box in open position.
Figure 2:
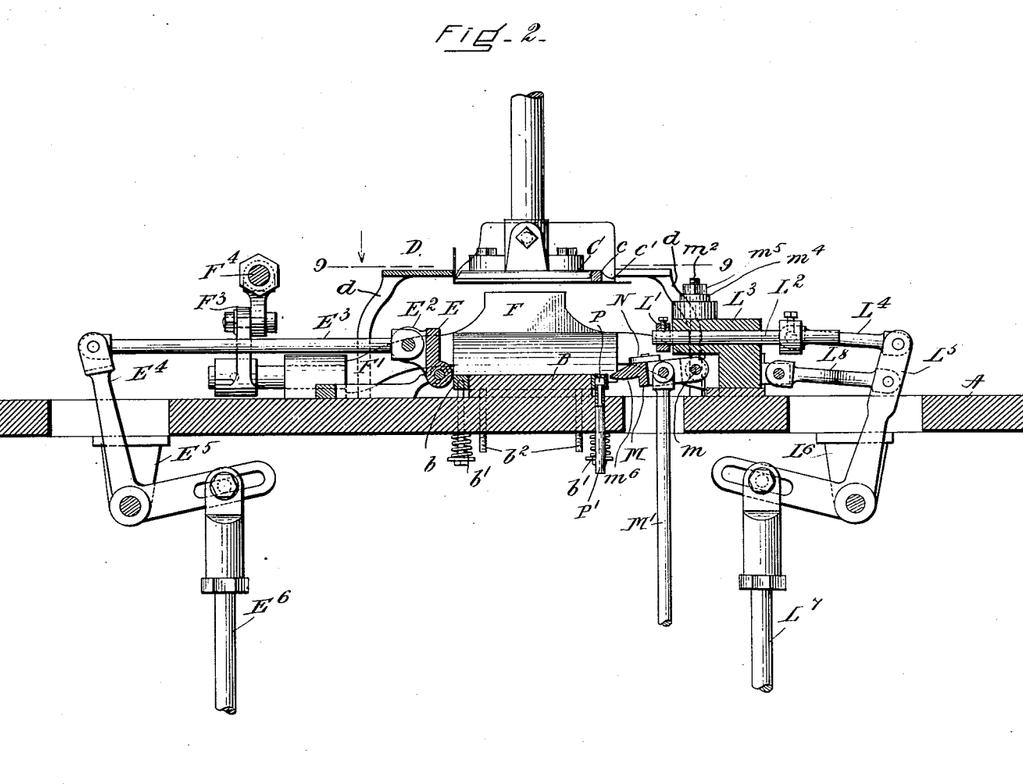
Figs. 2, 3 and 4 representing sections on lines 2—2, 3—3 and 4—4, respectively, of Fig. 1.

The ejectors K are moved forward across the folding box from the position shown in Fig. 1 through openings $g^1$ in the folder G to push the finished cup out through an opening $f$ under the folder F in the usual way. To the slide piece $K^1$ is attached a rod $J^1$ which is slotted as at $j$ to carry a pin $j^1$ mounted on the slide piece $K^1$. This rod $J^1$ is pivoted at $j^2$ and has connected therewith a slotted arm $j^3$ to which is attached, by a pin $j^4$ running in the slot, the lever $J^2$, $j^5$ being the pivot therefor. The end of the lever $J^2$ is forked as at $j^6$, riding between collars on the outer end of the rod J, this construction being such that as the slide piece is thrown in toward the folding box to eject the finished drinking cup, the end of the rod J will engage the end of the slide H and throw it forward until its shoulder $h$ engages the head $h^3$. It will be understood from Fig. 4 that the various supports for the connections between the slide piece $K^1$ and the lever $J^2$ should be of such heights from the bed plate that the rod J and the slide piece H will bear proper registering relation to each other.

The slide H and the piece $H^2$ are withdrawn when the folder G is in a folding position. For this purpose I have provided a rod L mounted in a collar $L^1$ which is attached to the end of a rod $L^2$ mounted in a housing $L^3$ which is adapted to slide on the bed plate A. The rod L is reciprocated by means of a connecting rod $L^4$ which is connected at one end by a suitable coupling to the rod $L^2$ and at the other end to the end of a bell crank lever $L^5$ fulcrumed on hangers $L^6$ below the bed plate A. A connecting rod $L^7$ connects this lever with a cam mechanism by which it is operated. A second connecting rod $L^8$ connects the housing $L^3$ with the lever $L^5$ so that the same motion of the lever $L^5$ will move both the rod L and the housing $L^3$, but as the rod L is connected to the outer end of the bell crank lever $L^5$ it will of course have a longer throw than the housing.

The means for giving the final fold to the drinking cup is also mounted in the housing and comprises a sliding folder M mounted to oscillate in hanging yielding bearings $m$ therein. These bearings will be understood from Fig. 8 where it will be seen that the housing $L^3$ is recessed to receive springs $m^1$ which surround the shanks $m^2$ of the bearings $m$, the lower end of each spring resting in the bottom of the recess $m^3$ and the upper end of each spring resting against a washer $m^4$ held in place by a nut $m^5$ on the upper end of its shank $m^2$. The springs are of considerable strength and adapted to hold the parts in substantially fixed position, at the same time to allow for yield when necessary.

Figures 6, 7, 8:
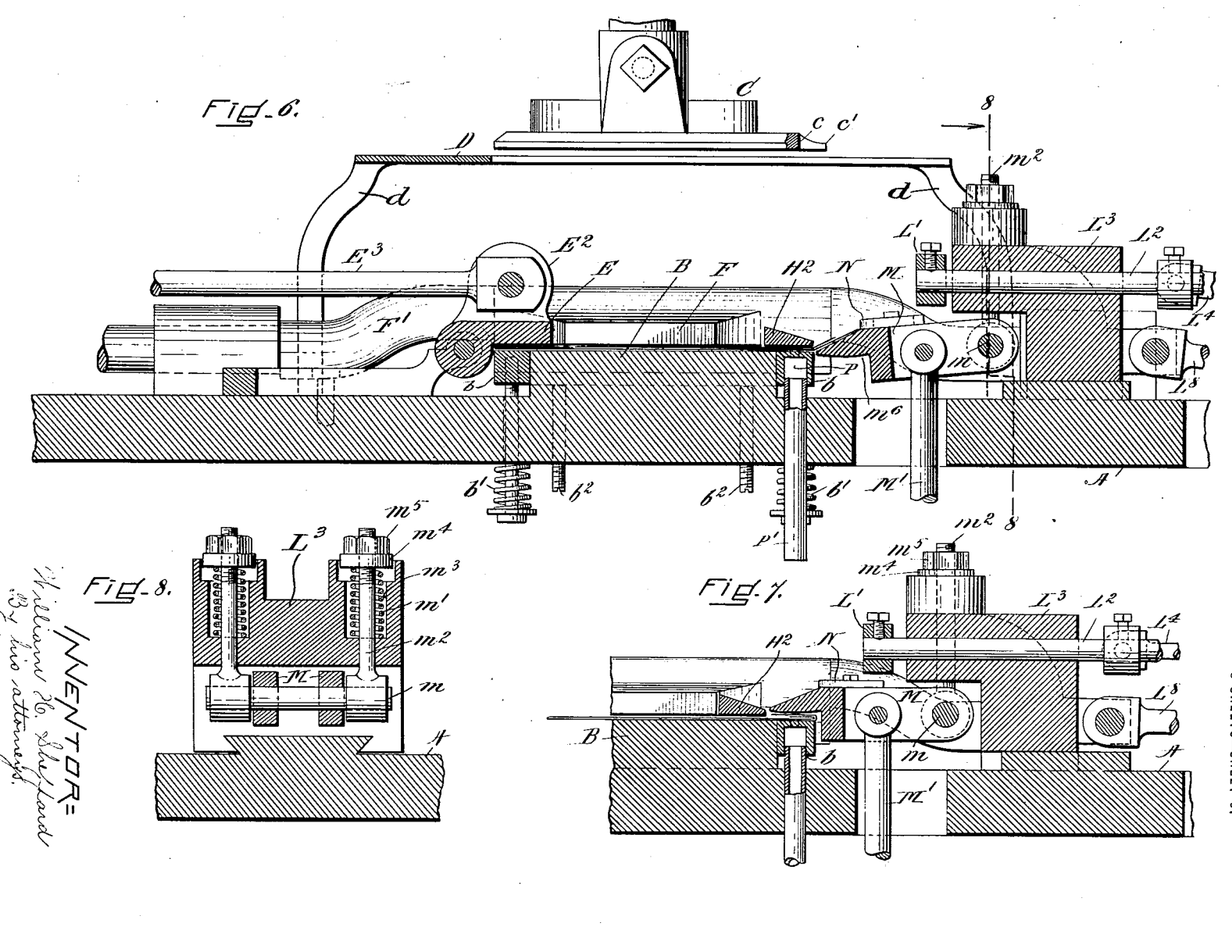
Fig. 6 is a section on line 6—6 of Fig. 5, these two figures showing the drinking cup but partially folded.
Fig. 7 is a section similar to Fig. 6, but showing the mechanism for completing the fold in its fold-completing position.
Fig. 8 is a section on line 8—8 of Fig. 6.
Figure 12:
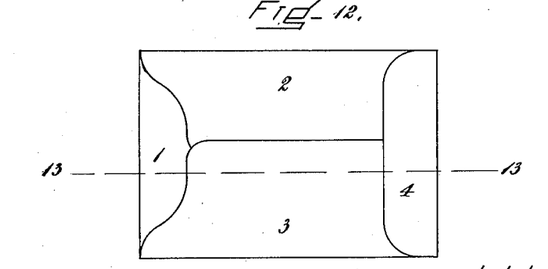
Fig. 12 the completed cup.
Figure 13:
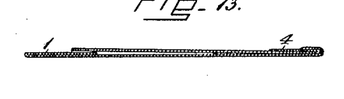
Fig. 13 being a section on line 13—13 of Fig. 12.
Figures 14, 15:
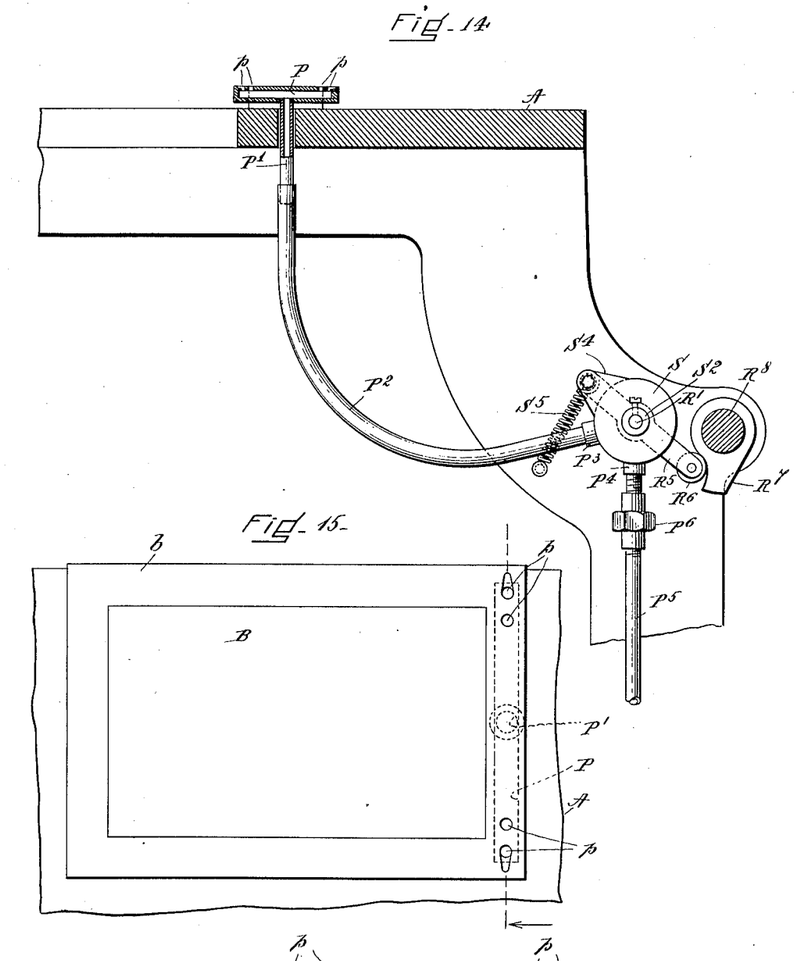
Fig. 14 is a sectional detail showing the construction of one end of the ring of the folding box.
Fig. 15 is a plan of the bottom of the folding box.
Figure 16:
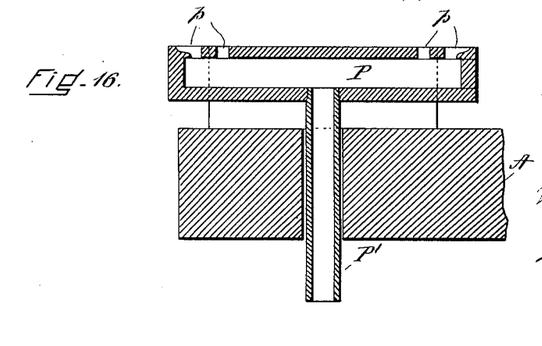
Fig. 16 is an enlargement of a portion of Fig. 14.

The working face of the sliding folder M is generally angular, its under horizontal surface $m^6$ being slightly curved as shown in Figs. 6 and 7. As stated above, it rocks slightly in its bearings $m$ and is caused to rock by means of a connecting rod $M^1$ which connects it with a cam of suitable shape as will be understood by those skilled in the art. This cam at the proper time moves the sliding folder M from the position shown in Fig. 6 to a position in which its surface $m^6$ is in an approximately horizontal plane. At that moment the housing $L^3$ is caused to move forward and slide the sliding folder against the edge of the slide piece $H^2$, the rod L operating to engage the end of the rod $H^1$ and move back the slide piece from the sliding folder and paper which has been creased thereby. The sliding folder has a further forward and slightly rocking movement to finish the folding and sealing of the blank. Gages N are mounted on the sliding folder M to keep the blank in proper register.

Figures 4, 10, 11:
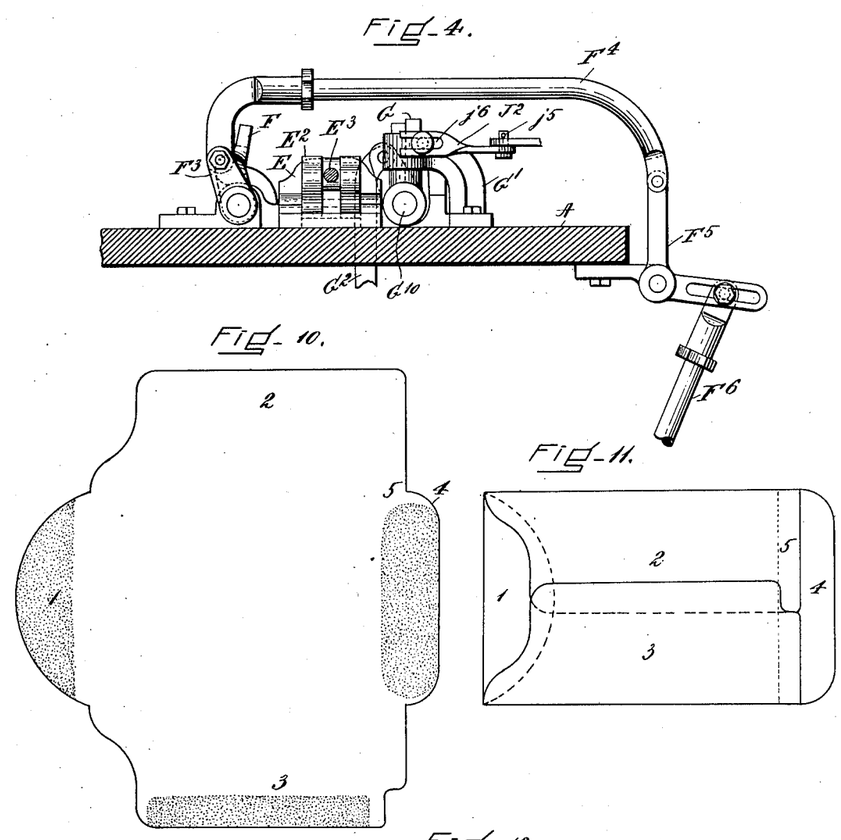
Fig. 10 shows the blank from which the drinking cup is made.
Fig. 11 showing the drinking cup partially completed.

In operation, the blank, gummed as shown in Fig. 10, is brought along and deposited on the creasing frame in the usual manner; the plunger descends, and the folding operation begins. The plunger is preferably recessed or cut away at one end as at $c$ so as not to engage the gum on the corresponding portion of the blank, and the creasing frame is open so that that end of the blank will not be creased.

The first operation is the closing in and sealing of the flap 1 (see Figs. 10 and 11) of the blank, this being accomplished by the folder E which folds the flap against the body of the cup to form a double thickness of paper at the mouth of the cup. Next the folder F folds the flap 2 and after that the folder G folds the flap 3, these folders operating in succession in the usual way. It will be understood that these three folders are so constructed and shaped that they may all lie in closed position (see Fig. 5) without interfering with each other and that during this operation the blank is in engagement with the gages N.

Figure 5:
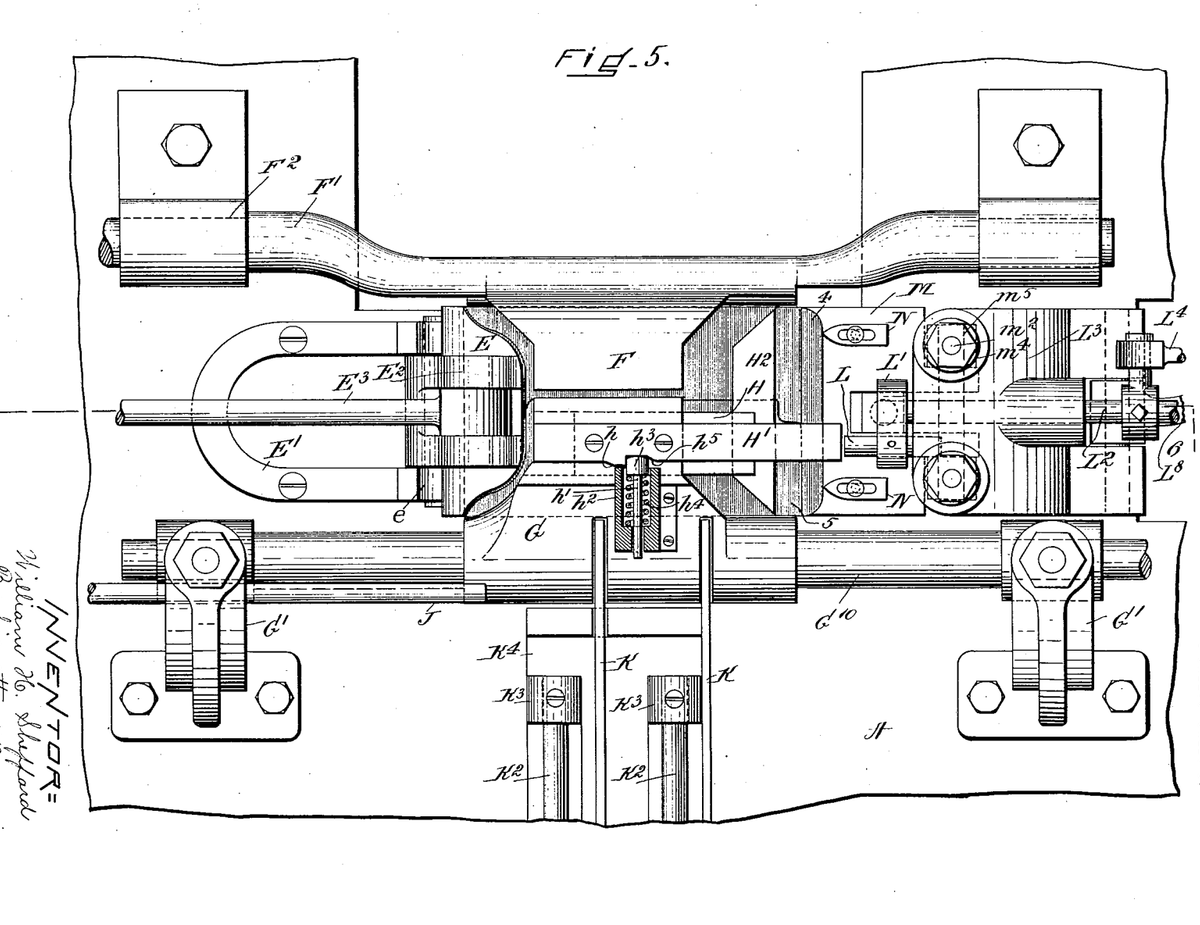
Fig. 5 is an enlarged view in plan of the folding box in closed position.

This leaves the blank in the position and condition shown in Figs. 5 and 11 where the end flap 4 is not folded. In order that the drinking cup may not leak at the corners, in addition to the flap 4 it is desirable to fold over a small margin of the bottom of the tubular portion of the drinking cup, say such portion of it as is indicated at 5, Fig. 11. It will be seen from Fig. 6 that the blank having been deposited upon the bed of the folding box and the flaps 1, 2 and 3 being turned in as shown in Fig. 11, there project therefrom both the portion 5 and the flap 4. In order to make this final fold the front end of the sliding folder M on which these portions rest, lifts up causing a crease to be begun along the edge of the piece $H^2$ as shown in Fig. 6, and as soon as it is out of line with the edge of the folding bed, the housing moves forward carrying the sliding folder forward over the ring and completes the fold. At the same time the rod $L^2$ begins to move forward and rod L engages the end of the bar $H^1$ to which the cross piece $H^2$ is connected. This withdraws the piece $H^2$ from under the part 5 of the blank so that the under surface $m^6$ of M slides over and folds the parts 4 and 5 over the portions 2 and 3 of the blank, and completes the folding of the drinking cup. The curved under surface $m^6$ allows the folder M to be rocked by the combined action of the rod $M^1$ and the spring-controlled hangers $m$, and complete the sealing of the blank. In its withdrawal the piece $H^2$ seals so much of the overlap 3 as is not pressed down by the folder G (see Fig. 5).

The housing $L^3$ and rod L are then withdrawn, the sliding folder being of course also withdrawn, and the ejector operates to eject the drinking cup. At the same time the piece $H^2$ having been withdrawn from its inoperative position, is now pushed forward into operative position by means of the rod J, and a new blank is fed to the folding box by the plunger.

As shown in the drawings the ring $b$ is of usual character and supported in a usual manner. I prefer, however, to construct the end of the ring which supports the parts 4 and 5 of the blank so that suction may be applied to hold that end of the blank during the folding operation, for the following reasons: When the blank has been forced through the creasing frame and into the folding box three of its flaps, 1, 2 and 3, are at right angles to its body and engage or tend to engage the folders E, F and G, which at that time stand also at right angles to the bottom of the folding box. When the plunger rises the frictional contact of these flaps with their folders prevents the blank from being withdrawn by suction or otherwise as the plunger rises. The fourth side of the blank, however, i. e., that having the flap 4, may have a tendency to rise and in rising disturb the proper registry of the blank in the folding box. The chamber P in the ring is for the purpose of preventing this part of the blank from being lifted, suction being applied at the proper time and released when the plunger is withdrawn from the blank and the folding operation is to begin. The chamber P has openings $p$ in its upper wall, i. e., on the face of the ring, and a tube P¹ projects from its under side and passes down through the bed plate A. To this tube P¹ is attached a connection P², preferably a rubber tube, which connects with the valve casing R.

Figures 18, 19, 20, 21:
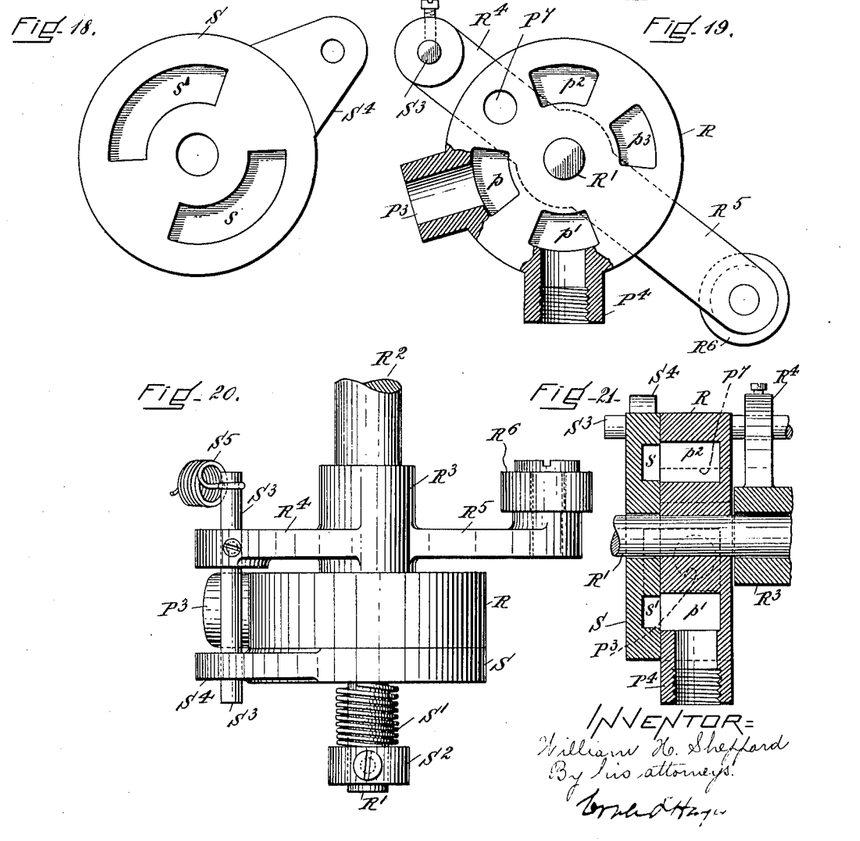
Figs. 18 and 19 are details thereof.
Fig. 20 is a top view of the valve.
Fig. 21 is a section on line 21—21 of Fig. 17.

This valve is an oscillating valve comprising two parts shown in Figs. 18 and 19. The casing R forms the stationary member of the valve and has a coupling P³ to which the tube P² is connected and a second coupling P⁴ which is connected by the union P⁶ with a pipe P⁵ leading to a suction pump (not shown). A stud R² is mounted on the frame of the machine. It is reduced in diameter near its outer end to form a shoulder (not shown) against which rests a hub R³ carrying two arms R⁴, R⁵. The part of the stud so reduced is lettered R¹. The arm R⁵ carries a cam roll R⁶ which engages a cam R⁷ mounted on a rock shaft R⁸. This rock shaft as shown is a shaft customary in envelop machines by means of which the carriage which carries the gummed blank from the gummer to the folding box, is operated, the shaft being ordinarily connected to the carriage by means of a rocker arm. Being well known, it is not further described. The cam R⁷, as it rocks, gives to the arm R⁵ a rocking motion which is communicated to the hub R³ and arm R⁴. The casing is mounted fast on the part R¹ of the stud R². The connection P³ opens into a chamber $p$ in the casing, and the connection P⁴ opens into a chamber $p^1$ in this member. P⁷ is an exhaust opening. The inner face of the movable member S of the valve is shown in Fig. 18. It is mounted on the stud R² and engages the casing R and is held against it by means of the spring S¹ and collar S² which clamps the spring on the part R¹ of the stud R². The movable member S is caused to move by means of a pin S³ which passes through an opening in its arm S⁴ and also through an opening in the arm R⁴ mounted on the hub R³. A spring S⁵ is attached at one end to the pin S³ and at the other to the frame of the machine to hold the arm R⁵ and its roll against the cam R⁷.

Figure 17:
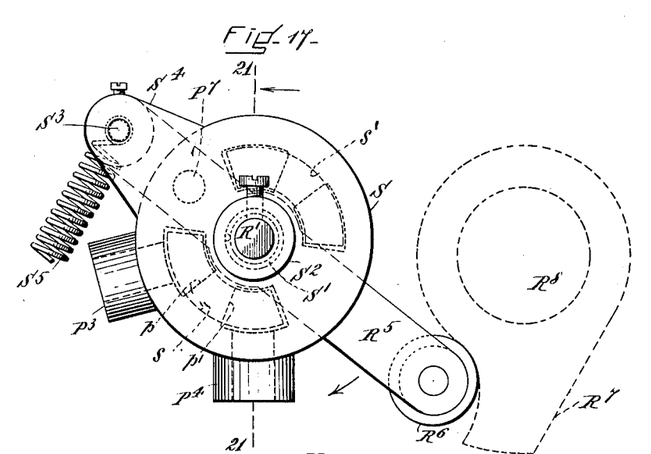
Fig. 17 is a side elevation of the valve for controlling the vacuum in the ring.

The movable member S has a passage $s$ so located therein with relation to the chambers of the stationary member that this passage engages each of the chambers $p$, $p^1$ in the stationary member. As will be seen from Fig. 17, the passage $s$ shown in dotted lines connects the chambers $p$, $p^1$ so that at this moment the suction pump (not shown) is withdrawing air from the chamber P in the ring. When the cam R⁷ has thrown the arm R⁵ and its connections in the direction of the arrow to its farthest limit the position of the passage $s$ will be changed so that it will connect the chamber $p$ with the exhaust P⁷ and the chamber $p$ will be filled with air, the connection with the suction pump through P⁴ and $p^1$ being broken.

This is merely one way, and a convenient way, of accomplishing this result, the movement of the parts being so timed that when the blank is driven into the folding box the vacuum will hold it there until the plunger has risen and will then release it so that the folding operation may take place as above described.

The recesses $p^2$, $p^3$ and $s^1$ perform no function.

So far as I know, folders in an envelop machine or the like have never been timed so to fold a flap that it will engage and stick it to the body of the blank, nor has a fold comprising a flap and a portion of the tube or body of the envelop been made so that the end will have a closure of double thickness by mechanism such as is described above. This mechanism I believe to be new with me in many of its details and in its operation. I do not therefore mean to limit myself to the mechanism shown as other mechanisms for the purpose will occur to those skilled in the art, which will come within the scope of my claims.

What I claim as my invention is:—

1. In a machine of the kind described, a folding bed, three folders mounted therein adapted to fold and seal three sides of the blank to form a tube open at both ends, said folders operating successively whereby the first folder to operate will fold and secure an end flap to the body of the blank and the second and third folders to secure the second and third flaps to each other.

2. In a machine of the kind described, a folding bed, and means for folding the four sides of a blank thereon in series whereby the first folder will fold and seal an end flap to the body of the blank and the second and third folders operate to secure the second and third flaps to each other to form a tube open at both ends, and means for folding and sealing the fourth flap.

3. In a machine of the kind described, a folding bed, three rocking folders mounted thereon, and means for rocking them whereby the first folder will fold and secure one end flap to the body of the blank and the second and third folders operate to secure the second and third flaps to each other to form a tube open at both ends, and a sliding folder and means for causing it to move parallel with the folding bed and fold and seal the fourth side of the blank.

4. In a machine of the kind described, a folding bed, and means for folding and sealing three sides of the blank whereby an end flap will be folded and secured to the body of the blank first and the second and third flaps will thereafter be secured to each other to form a tube open at both ends, and means for folding over a portion of the tube carrying the fourth flap and sealing said fourth flap to close one end thereof.

5. In a machine of the kind described, a folding bed, and means for folding and sealing three sides of the blank to form a tube open at both ends, comprising three folders, the first folder folding and securing an end flap to the body of the blank and the second and third folders operating to secure the second and third flaps to each other, and means for folding and sealing the fourth side of the blank and a portion of the tube to close one end thereof, said last-named means comprising a folding member and means for causing it to slide over one edge of the folding bed to fold and seal the end of the tube.

6. In a machine of the kind described, a folding bed, and means for folding and sealing three sides of the blank on said bed to form a tube open at both ends, and means for folding and sealing the fourth side of the blank and a portion of the tube while on said bed to close one end thereof, said last-named means comprising a folding member normally located below the edge of the folding bed and means for causing it to rise and slide over the edge of the folding bed.

7. In a machine of the kind described, a folding bed, and means for folding and sealing three sides of the blank on said bed to form a tube open at both ends, and means for folding and sealing the fourth side of the blank and a portion of the tube while on said bed to close one end thereof, said last-named means comprising a folding member normally located below the edge of the folding bed, means for causing it to rise and slide over the edge of the folding bed, and means for clamping the unfolded edge of the blank during the upward movement of the sliding folder.

8. In a machine of the kind described, a folding bed, and means for folding and sealing three sides of the blank on said bed to form a tube open at both ends, and means for folding and sealing the fourth side of the blank and a portion of the tube while on said bed to close one end thereof, said last-named means comprising a folding member normally located below the edge of the folding bed, means for causing it to rise and slide over the edge of the folding bed, and means for clamping the unfolded edge of the blank during the upward movement of the sliding folder, the adjacent edge of said clamping means and said sliding folder being in substantially the same planes whereby in its upward movement the unfolded end of said blank will be creased between said edges.

9. In a machine of the kind described, a folding bed, and means for folding and sealing three sides of the blank on said bed to form a tube open at both ends, and means for folding and sealing the fourth side of the blank and a portion of the tube while on said bed to close one end thereof, said last-named means comprising a folding member normally located below the edge of the folding bed, means for causing it to rise and slide over the edge of the folding bed, and means for clamping the unfolded edge of the blank during the upward movement of the sliding folder, and means for withdrawing said clamping means simultaneously with the advance of said sliding means over the folding bed.

10. In a machine of the kind described, a creasing frame having an open end, a plunger adapted to coöperate with said creasing frame to crease three sides of a blank, a folding box comprising a bed and three rocking folders located to fold the creased sides of the blank, means whereby said folders may be rocked, gages located to engage the edge of the unfolded side of the blank to hold the blank in place in the folding box, and means for folding the fourth side of the blank.

11. In a machine of the kind described, a creasing frame having an open end, a plunger adapted to coöperate with said creasing frame to crease three sides of a blank, said plunger being recessed at one end thereof, whereby it will engage a portion only of the body of the blank, a folding box comprising a bed and three rocking folders located to fold the creased sides of the blank, means whereby said folders may be rocked, gages located to engage the edge of the unfolded side of the blank to hold the blank in place in the folding box, and means for folding the fourth side of the blank.

12. In a machine of the kind described, a folding box comprising a bed and three rocking folders adapted to fold three sides of a blank on said bed, and means for folding the fourth side of said blank while on said bed comprising a sliding folder normally located below the level of said bed, means for raising said folder, means for sliding it over the edge of said bed, means for clamping the blank on said bed, and means for reciprocating said clamping means.

13. In a machine of the kind described, a folding mechanism comprising a folding bed and a plurality of means adapted to coöperate therewith to fold in the sides of a blank, and a clamping means comprising a slide located in one of said folding means and a crossbar carried thereby to engage the upper surface of said blank, and means for reciprocating said slide.

14. In a machine of the kind described, a folding mechanism comprising a folding bed and a plurality of means adapted to coöperate therewith to fold in the sides of a blank, and a clamping means comprising a slide located in one of said folding means and a crossbar carried thereby to engage the upper surface of said blank, and means for reciprocating said slide, said slide-moving means being independent of said slide.

15. In a machine of the kind described, a folding mechanism comprising a folding bed and a plurality of means adapted to coöperate therewith to fold in the sides of a blank, and a clamping means comprising a slide located in one of said folding means and a crossbar carried thereby to engage the upper surface of said blank, and means for reciprocating said slide, said slide-moving means being independent of said slide and comprising two rods, one adapted to engage and move said slide in a direction to withdraw said clamp and the other adapted to engage and move said slide into operative position.

16. In a machine of the kind described, a folding mechanism comprising a folding bed and a plurality of means adapted to coöperate therewith to fold in the sides of a blank, and a clamping means comprising a slide located in one of said folding means and a crossbar carried thereby to engage the upper surface of said blank, and means for reciprocating said slide, said slide-moving means being independent of said slide and comprising two rods, one adapted to engage and move said slide in a direction to withdraw said clamp and the other adapted to engage and move said slide into operative position, in combination with means for ejecting the finished article from the folding box and a means for operating said ejecting means simultaneously with the movement of said slide into operative position.

17. In a machine of the kind described comprising a folding bed and four folders, one of said folders being a sliding folder, means for reciprocating said sliding folder comprising a sliding housing, said sliding folder being pivoted therein, a lever and means for rocking it, and a connection between said lever and said housing and means for rocking said sliding folder.

18. In a machine of the kind described comprising a folding bed and four folders, one of said folders being a sliding folder, means for reciprocating said sliding folder comprising a sliding housing, a lever and means for rocking it, and a connection between said lever and said housing, in combination with a reciprocating clamp adapted to clamp a blank in front of the sliding folder, and means for withdrawing said clamp comprising a reciprocating rod also connected to said lever.

19. In a machine of the kind described, a folding mechanism comprising a rocking folder and means for rocking it, a slide mounted therein carrying a clamp to clamp the blank in said folding mechanism, means for withdrawing the clamp operable while said folder is in folding position, and means for returning the clamp to its normal position operable while said folder is in non-folding position.

20. In a machine of the kind described, a folding mechanism comprising a bed, rocking folders adapted to fold and partially seal three sides of the blank, means for creasing and folding the fourth side of the blank while on said bed comprising a clamp and means for moving it rearwardly from said fourth side and in engagement with the blank whereby it will complete the sealing of the adjacent sides.

21. In a mechanism of the kind described, a folding bed provided with a yielding ring, said ring having a suction chamber therein, in combination with means for intermittently exhausting the air from said chamber.

22. In a machine of the kind described, in combination with means for folding three sides of an envelop blank, said means being normally in a vertical position to frictionally engage three creased flaps of an envelop blank and keep them in position to be folded, a folding bed containing a suction chamber, and means for applying suction to a blank lying on said bed whereby the fourth side of said blank will be held in folding position.

WM. H. SHEPPARD.